E. J. FRANCK, W. SOMMERS & L. FRITZ.
COFFEE MILL.
APPLICATION FILED APR. 5, 1911.
1,011,603.
Patented Dec. 12, 1911.
2 SHEETS—SHEET 1.
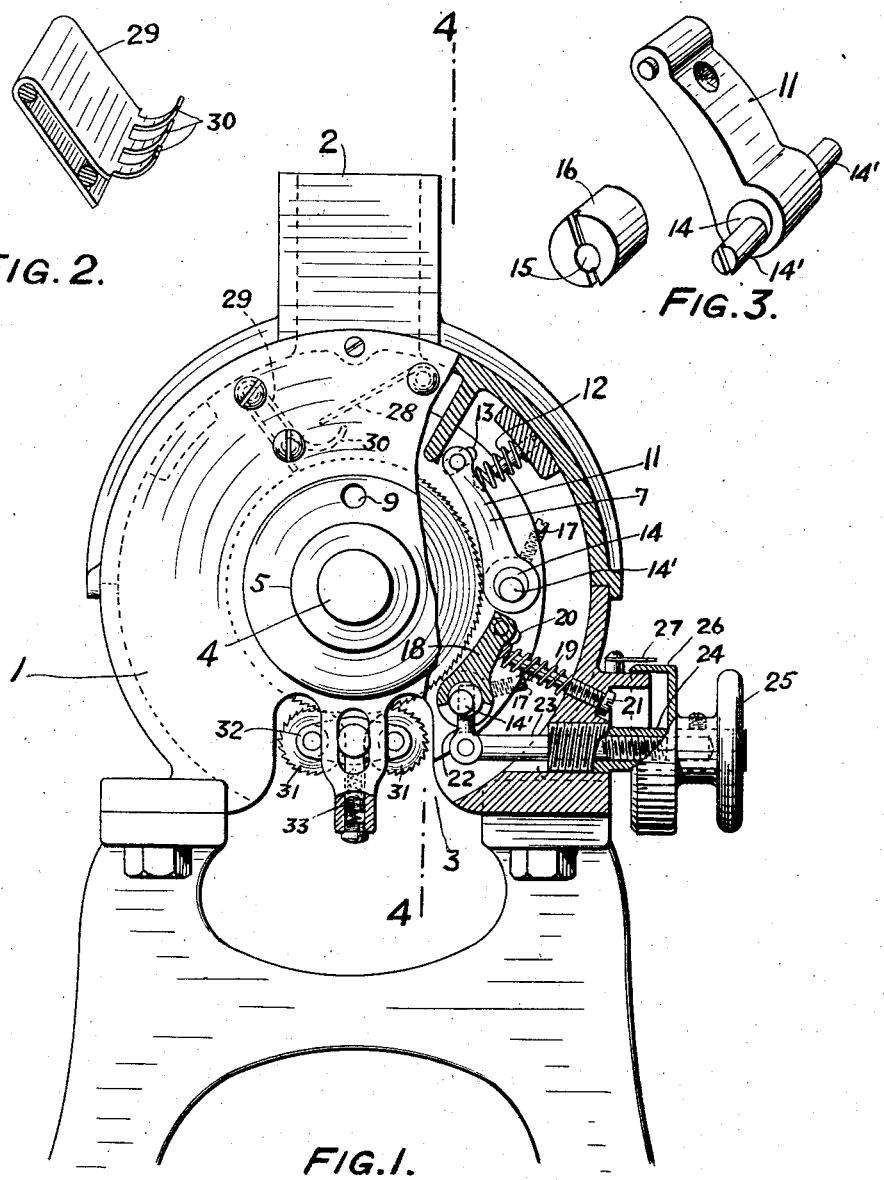
WITNESSES:
INVENTORS
Emil J. Franck
William Sommers and
Louis Fritz
BY
Augustus B. Stoughton
ATTORNEY

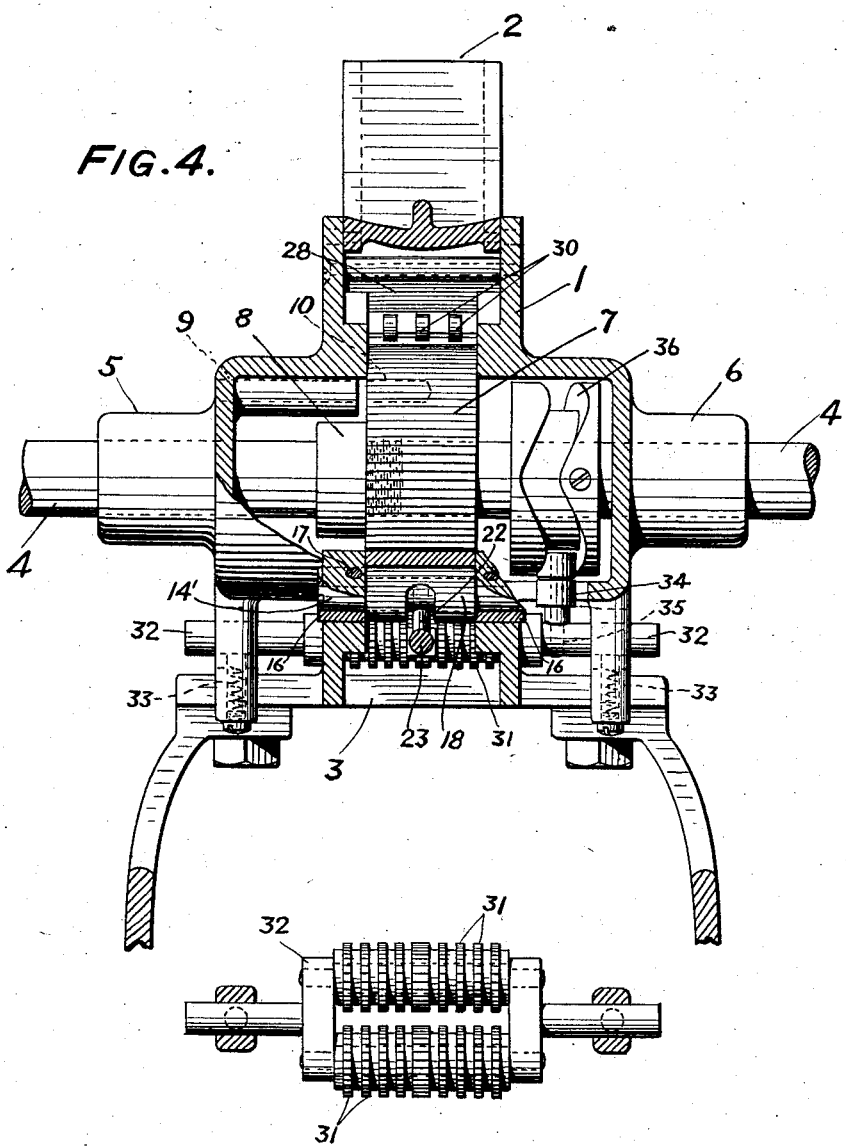

UNITED STATES PATENT OFFICE.

EMIL J. FRANCK, WILLIAM SOMMERS, AND LOUIS FRITZ, OF PHILADELPHIA, PENNSYLVANIA.

COFFEE-MILL.

1,011,603.  Specification of Letters Patent.  Patented Dec. 12, 1911.

Application filed April 5, 1911.  Serial No. 619,099.

*To all whom it may concern:*

Be it known that we, EMIL J. FRANCK, WILLIAM SOMMERS, and LOUIS FRITZ, citizens of the United States, and residents of Philadelphia, in the county of Philadelphia and State of Pennsylvania, have jointly invented certain new and useful Improvements in Coffee-Mills, of which the following is a specification.

The principal object of the present invention is to provide a light running, simple, reliable and efficient machine for not only grinding, but also, if desired, pulverizing coffee.

Another object of the invention is to so construct, arrange and combine the parts of the machine that the coffee when pulverized is cool, as it is well known that it is undesirable to heat the coffee during the pulverizing operation.

Another object of the invention is to provide for easily changing the operation of the machine, so that the coffee may be ground or pulverized, as desired.

Another object of the invention is to protect the machine, as well as the coffee, from extraneous objects such as nails.

Another object of the invention is to avoid the use of weights for feeding the coffee to be pulverized, and other objects of the invention will appear from the following description taken in connection with the accompanying drawings, forming part hereof, and in which—

Figure 1, is a side view, with parts broken away, of a mill embodying features of the invention. Figs. 2 and 3, are perspective views illustrating parts of the machine. Fig. 4, is a sectional view taken on the line 4—4 of Fig. 1, with parts broken away, and Fig. 5, is a plan view of parts showing details.

In the drawings 1 is a housing open at the top 2 for the reception of coffee and at the bottom 3 for the discharge of the same.

4 is a shaft arranged horizontally and journaled in the housing, as at 5 and 6. The shaft 4 carries a milling cutter 7 which is provided upon its peripheral surface with axially ranging teeth, much like the teeth of a milling cutter. As shown the shaft 4 is provided with a collar 8 and is threaded so that the milling cutter 7 is screwed on it. For this purpose the housing is provided with an opening 9 and the milling cutter with an opening 10. A tool can be inserted through the opening 9 into the opening 10 and it will serve to hold the cutter at rest while the shaft 4 can be turned. This, of course, is done only in assembling and disassembling the parts. Ordinarily the cutter turns with the shaft by reason of the collar 8 and threaded connections. The cutter, as shown in the drawings, runs in a clock-wise direction.

11, is a shoe pivoted at its lower end and having its free end movably supported by means of a spring 12. The range of motion of the free end is limited by a pin on the cutter working in a slot 13 in the housing. The pivot for the shoe is adapted to adjust the position of the shoe toward and away from the face of the cutter. It consists of a short shaft 14 which fits a corresponding opening in the shoe so that the shoe may turn on it. The short shaft is provided with pintles 14' arranged eccentrically in respect to it. The pintles 14' work in openings 15 made eccentrically through plugs 16 which fit in openings in the housing. In assembling the parts, the plugs 16 are initially adjusted so as to get the bearing alined. Thereafter they need not be disturbed. For further adjustment, the pintles 14' and shaft 13 which as has been said constitute one piece, are turned in respect to the plugs 16 which are at rest, and the effect of this is to throw the pivot point of the shoe nearer to or farther from the center of the milling cutter.

17, is a set-screw by means of which the pintles are clamped after they have been adjusted.

The purpose of adjusting the pivot of the shoe is to regulate the extent to which the coffee is ground. For pulverizing the ground coffee another shoe 18 is provided. Its free end is controlled by a spring 19, the effective strength of which can be adjusted by the screw 21 and the movement of the free end is limited by the slot 20, in which a pin works. The pivot for this shoe is the same as has been described, except that the pintle 14', which has as a part of it the short shaft 13, is provided with an arm 22. The arm 22 works in a slot formed in the shoe. Connected to the arm 22 is a link 23 threaded to engage the hollow stem 24 of the hand-wheel 25. The stem 24 is threaded externally and engages the housing. The hand wheel is provided with a dial 26 and there is a fixed pointer 27 so that when the wheel is turned its position can be noted by the pointer and a slight turn of the wheel by reason of the two sets of threads produces a magnified movement of the link 23 and arm 22. The adjustment required is small and it is desirable that its amount can be noted, otherwise the pivot of the shoe 18 might be moved too much and this pivot is moved for two purposes, one to adjust the pulverizing action and the other to discontinue the pulverization of the coffee.

Each of the shoes as will be seen by reference to the drawings has its shank or part adjacent to the pivot provided with a smooth toothless cylindrical face which is concentric with the pivot so that no matter what position the toothless free end of the shoe may assume, the distance between the face of the cutter and the cylindrical face of the shank of the shoe remains the same. It is therefore impossible for particles or berries of coffee too large to pass this space to go through the mill until their size is reduced sufficiently to pass this space. The smooth face of the shoe permits a berry or part of a berry which tends to wedge between the face of the cutter and the cylindrical part of the shoe to slip as the shoe turns and thus occupy a new position in which the teeth of the cutter can reduce it to particles small enough to pass between the cutter and the cylindrical shank of the shoe.

Not infrequently nails and such objects are present in the coffee and they are removed by the device to be described.

There is an inclined plate 28 extending cross-wise of the throat and a plate 29 provided with curved teeth 30, which underlie the end of the plate 28. Coffee berries pass between the teeth, but nails and such objects are caught by the teeth. The teeth of the milling cutter 7 are cleaned or freed from coffee by means of toothed disks 31 with spaces between them, which are moved cross-wise of the cutter. Two sets of such disks are shown as revolubly mounted in a frame 32 afforded end-wise motion across the face of the cutter. 33 are springs which yieldingly hold this frame up to the cutter. The frame is provided with a roller 34 mounted on a stud and working in a slot in the housing so that this roller and stud insure end-wise motion of the frame. This stud 35 or more accurately a roller on the end of it, works in the groove of the cam 36, fast on the shaft 4, so that when the machine is in operation the cam moves the carrier back and forth end-wise and the toothed disks 31 traveling across the face of the cutter and rotating with it, clean its teeth. The spaces between the disks permit the material to fall into a proper receptacle, which is not shown.

The shaft 4 may be turned by hand since the machine requires comparatively little power even when pulverizing coffee, or it may be, of course, operated by a suitable motor. The free end of the shoes are turned toward the on-coming cutter so that the coffee is, as it were, forced by the shoes up to the face of the cutter and in this way it is ground and, if desired, pulverized, and this is accomplished without heating the coffee.

What we claim is:

1. A coffee mill comprising the combination of a housing, a milling cutter arranged in the housing and revoluble on a horizontal axis and provided on its face with teeth, a pivotally supported grinding shoe and a pivotally supported pulverizing shoe each having its free end turned toward the on-coming cutter, and each having a cylindrical end concentric with its pivot which cylindrical end limits the space between the shoe and cutter in any position of the former springs for holding the free ends of the shoes up to their work, adjustable pivots for the shoes, whereby their pivoted ends can be moved toward and away from the center of the cutter, toothed disks with spaces between them adapted to run in contact with the face of the cutter, a carriage for said disks, and means interposed between the shaft and carriage for shifting the latter axially of the cutter, substantially as described.

2. In a coffee mill the combination of a housing, a milling cutter revoluble in the housing and having teeth on its face, a shoe having a cylindrical end, yielding means for supporting the free end of the shoe, a pivot for the shoe concentric with the cylindrical end thereof and having eccentric pintles and a projecting arm, a handle having screw and thread connection with the housing, and a link connected with the arm and having screw and thread connection with the handle, substantially as described.

3. In a coffee mill the combination of a housing, a milling cutter revoluble in the housing and having teeth on its face, a series of toothed disks having spaces between and adapted to contact with the face of the cutter, a yielding carriage for the disks, and means for reciprocating the carriage cross-wise of the cutter, substantially as described.

In testimony whereof we have hereunto signed our names.

EMIL J. FRANCK.
WILLIAM SOMMERS.
LOUIS FRITZ.

Witnesses:
CLIFFORD K. CASSEL,
K. M. GILLIGAN.

Copies of this patent may be obtained for five cents each, by addressing the "Commissioner of Patents, Washington, D. C."